United States Patent
Gloeckner et al.

(10) Patent No.: US 11,697,376 B2
(45) Date of Patent: Jul. 11, 2023

(54) LUGGAGE NETS IN THE VEHICLE ROOF OF ROAD CONSTRUCTION MACHINES

(71) Applicant: JOSEPH VOEGELE AG, Ludwigshafen/Rhein (DE)

(72) Inventors: Tom Gloeckner, Kaiserslautern (DE); Maximilian Theobald, Ludwigshafen (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 451 days.

(21) Appl. No.: 16/933,265

(22) Filed: Jul. 20, 2020

(65) Prior Publication Data

US 2021/0016715 A1    Jan. 21, 2021

(30) Foreign Application Priority Data

Jul. 19, 2019 (DE) .......................... 202019103991.4

(51) Int. Cl.
| | |
|---|---|
| *B60R 7/04* | (2006.01) |
| *B60R 11/00* | (2006.01) |
| *E01C 19/48* | (2006.01) |
| *B60R 11/06* | (2006.01) |

(52) U.S. Cl.
CPC ............... *B60R 7/04* (2013.01); *B60R 11/00* (2013.01); *E01C 19/48* (2013.01); *B60R 11/06* (2013.01); *B60R 2011/0028* (2013.01); *B60R 2011/0078* (2013.01); *E01C 2301/04* (2013.01); *E01C 2301/30* (2013.01)

(58) Field of Classification Search
CPC ........... B60R 7/04; B60R 11/00; B60R 11/06; B60R 2011/0028; B60R 2011/0078; B60R 9/048; B60R 9/04; E01C 19/48; E01C 2301/04; E01C 2301/30
USPC ..................................................... 296/190.08
See application file for complete search history.

(56) References Cited

U.S. PATENT DOCUMENTS

| | | | |
|---|---|---|---|
| 6,851,903 B1 * | 2/2005 | Foggy .................. | B60P 7/0876 410/97 |
| 8,950,803 B2 | 2/2015 | Herzberg et al. | |
| 9,713,987 B2 | 7/2017 | Arvidsson et al. | |

FOREIGN PATENT DOCUMENTS

| | | | | |
|---|---|---|---|---|
| CN | 112550163 A | * | 3/2021 | |
| DE | 77 38 008 U1 | | 3/1978 | |
| DE | 20 2012 003 669 U1 | | 7/2013 | |
| DE | 21 2013 000 318 U1 | | 7/2016 | |
| DE | 102015011813 A1 | | 3/2017 | |
| EP | 2 382 123 B1 | | 10/2014 | |
| EP | 3 115 238 A1 | | 1/2017 | |
| EP | 3124698 B1 | * | 7/2017 | ............. E01C 19/08 |

OTHER PUBLICATIONS

Picture of a Volvo paving machine with a roof mounted storage compartment. Picture was taken Apr. 9, 2019, at the Bauma International Trade Fair held in Munich, Germany (1 page).

(Continued)

*Primary Examiner* — Pinel E Romain
(74) *Attorney, Agent, or Firm* — Brooks Kushman P C.

(57) ABSTRACT

The present disclosure refers to a road construction machine in the form of a road finisher or a feeder vehicle with a chassis and a driver's cab with a vehicle roof. According to the disclosure, one or more luggage nets are attached to the vehicle roof of the road construction machine.

20 Claims, 4 Drawing Sheets

(56) References Cited

OTHER PUBLICATIONS

European Search Report dated Sep. 14, 2020, Application No. 20168627.6-1002, Applicant Joseph Voegele AG, 7 pages.
German Search Report dated Mar. 25, 2020, Application No. 20 2019 103 991.4, Applicant Joseph Voegele AG, 8 Pages.
Von der Digitalisierung der Dynapac-Fertiger, Mar. 26, 2019 (with English Translation—From the digitalization of Dynapac pavers) https://www.baunetzwerk.biz/von-der-digitalisierung-eines-fertiger,8 Pages.

* cited by examiner

LUGGAGE NETS IN THE VEHICLE ROOF OF ROAD CONSTRUCTION MACHINES

CROSS-REFERENCE TO RELATED APPLICATIONS

This application claims foreign priority benefits under 35 U.S.C. § 119(a)-(d) to European patent application number DE 202019103991.4, filed Jul. 19, 2019, which is incorporated by reference in its entirety.

TECHNICAL FIELD

The present disclosure refers to a road construction machine, which is a road finisher or a feeder vehicle for a road finisher, with a driver's cab.

BACKGROUND

Road construction machines usually have a driver's cab equipped with operating elements, a seat for the operator of the machine and vehicle roofs to protect the operator from the weather. There is also a need to stow away the personal and/or work-related items of the operator without restricting the workplace or other functionalities of the machine, or causing a reduction in the field of vision. However, no satisfactory solutions have been found to date for creating stowing space for personal and work-related items of the operator for driver's cabs of the road construction machines

SUMMARY

An object of the present disclosure is to provide a user-friendly road construction machine.

This object is solved by a road finisher or feeder with the possibility of attaching luggage nets in the vehicle roof according to the disclosure.

The road construction machine in the form of a road finisher or a feeder vehicle with a chassis provides for a driver's cab with a vehicle roof on the chassis. According to the disclosure, one or more luggage nets are attached to the vehicle roof of the road construction machine. This provides a safe, quick and practical solution for the operators of the road construction machine to stow their personal or work-related items without restricting their usual environment and without reducing the view from the cabin of the driver's cab.

In another design variant, the vehicle roof has one or more awnings, and one or more luggage nets can be attached to one of the awnings of the vehicle roof. By using the awning area as a mounting point for the luggage nets on the vehicle roof, the space available in the driver's cab can be optimally utilized.

The luggage net may be an elastic component which allows the stowage of items, which can vary in size and shape, on the vehicle roof.

In one embodiment, the luggage net is an elastic component.

In another embodiment, the luggage net is an inelastic component.

These variants make it possible to stow heavy objects without reducing the view from the cabin of the driver's cab due to swaying of the luggage nets.

The meshes of at least one luggage net may have a measurement from 0.5 mm to 50 mm. The fine-mesh fabric of the luggage net allows smaller objects to be stowed.

In a simple yet stable variant, the luggage net is fixed to the vehicle roof and/or to one of the awnings of the vehicle roof.

In another advantageous embodiment, a luggage net is attached to the vehicle roof and/or to one of the awnings of the vehicle roof in a detachable manner without the need for tools, whereby the luggage nets can be exchanged or removed, if necessary, in a simplified manner.

In an advantageous design, the luggage net is attached to the vehicle roof and/or to one of the awnings of the vehicle roof by means of two lateral connecting consoles. The connecting consoles allow a safe attachment and use of the luggage net at the vehicle roof and/or at one of the awnings of the vehicle roof.

The connecting, consoles may be made of plastic so that the roof does not become too heavy.

It may be particularly advantageous if a luggage net is attached to the vehicle roof and/or to one of the awnings of the vehicle roof by means of a guide rail, e.g., in a sliding way. This allows the positions of the luggage nets to be changed.

At least one luggage net may have a welt attached to the luggage net. This welt may be attached to the vehicle roof or to rails incorporated in the awnings of the vehicle roof.

BRIEF DESCRIPTION OF THE DRAWINGS

In the following, exemplary embodiments are explained on the basis of the Figures.

DETAILED DESCRIPTION

Figure 1:
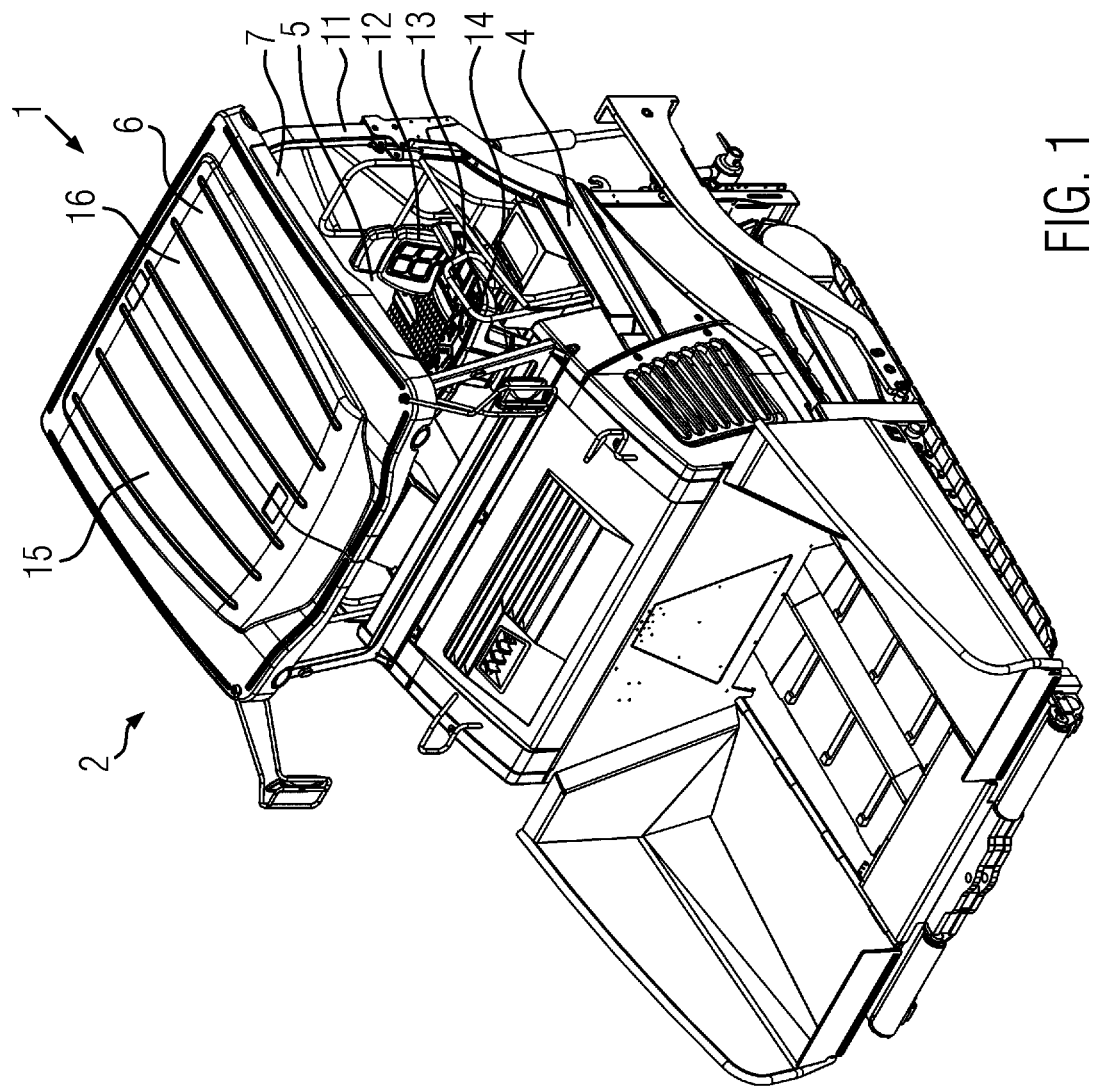
FIG. 1 shows a schematic perspective view of a road construction machine in the form of a road finisher.

FIG. 1 shows a perspective view from a diagonal front of a road construction machine 1, which is a road finisher 2 for producing a road surface. This road finisher 2 usually has a chassis 4 and a driver's cab 5 mounted on the chassis 4, in which a driver stays while the road finisher 2 is in operation. The driver's cab 5 can be designed open, i.e., not closed like a cabin. It is also customary to enclose the driver's cab 5 with lateral boundaries, e.g., in the form of railing-like struts, which leave an entrance free at the rear of the road finisher 1 for entering the driver's cab 5.

Figure 2:
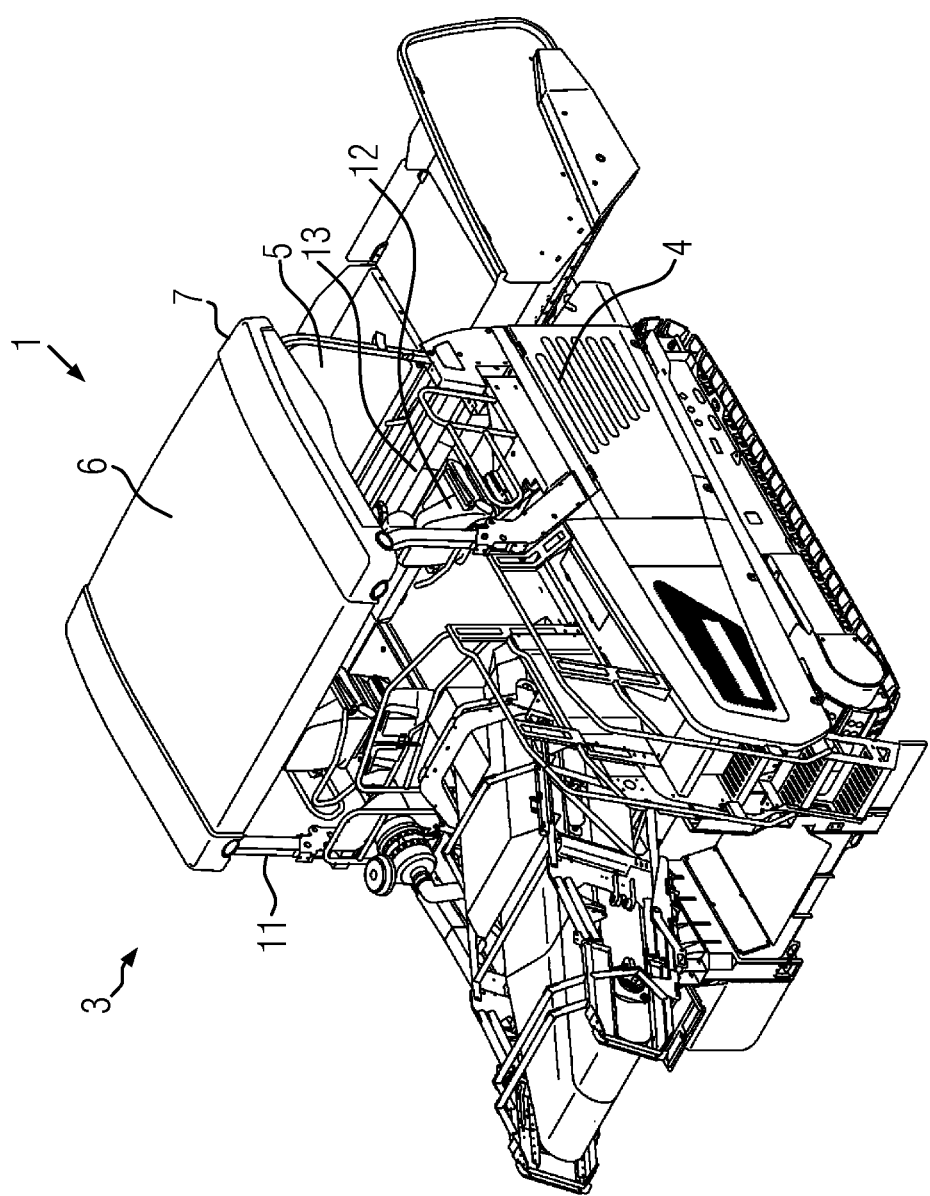
FIG. 2 shows a schematic perspective view of a road construction machine in the form of a feeder vehicle.

FIG. 2 shows a perspective view of a road construction machine 1 from diagonally back, which is a feeder vehicle 3 for a road finisher 2. The feeder vehicle 3 supplies the road finisher 2 with paving material, is self-propelled and has a chassis 4 and a driver's cab 5 located above the chassis 4 in the usual manner.

The driver's cab 5 of road construction machine 1 is spanned by a vehicle roof 6, which is supported by a stand structure 11. The stand structure 11 can be folded to lower the vehicle roof 6 to a lower transport position on the driver's cab 5. The driver's cab 5 may contain other elements such as one or more seats 12 or a control panel 13 with controls 14 for operating the road construction machine 1.

Figure 3:
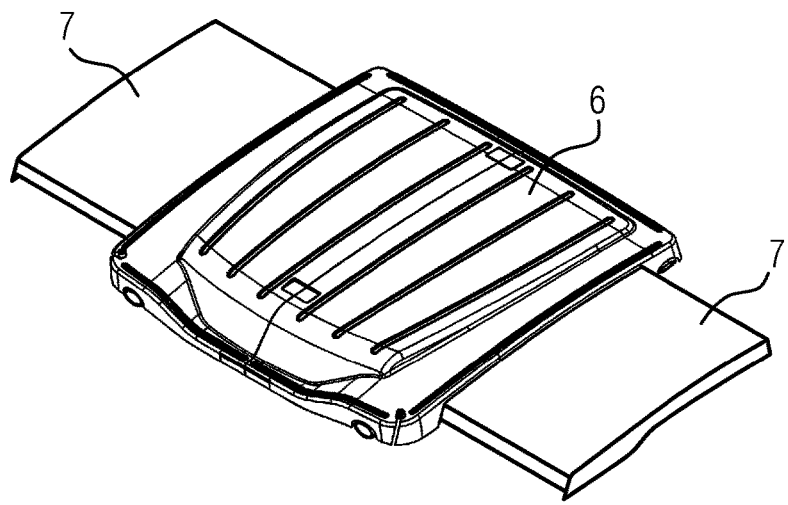
FIG. 3 shows a schematic perspective view of a vehicle roof and awnings of a road construction machine extendably attached thereon.

FIG. 3 shows a schematic perspective view of a vehicle roof 6 from the front. The vehicle roof 6 comprises first and second roof modules 15 and 16, respectively, which are mirror-images of each other in this embodiment. Each roof module 15, 16 of vehicle roof 6 can have an awning 7, which provides additional protection against rain and sun. The awnings 7 can be arranged on the roof module 15, 16 of the vehicle roof 6 in an extendable manner. FIG. 3 shows the awnings 7 when extended.

Figure 4:
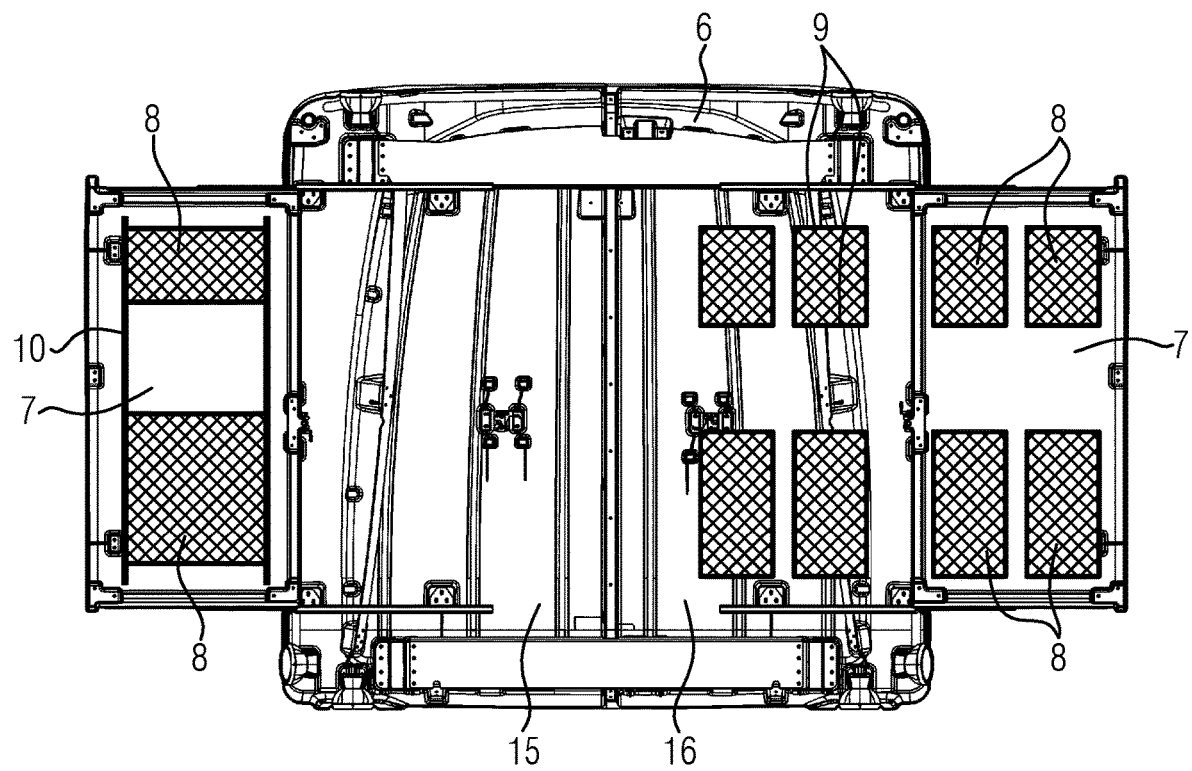
FIG. 4 shows a schematic bottom view of the vehicle roof shown in FIG. 3.

FIG. 4 shows a schematic underside of a vehicle roof 6 with retractable awnings 7 mounted on the vehicle roof 6. One or (here) more luggage nets 8 are mounted on the vehicle roof 6, for example directly on one of the roof modules 15, 16 or, as shown in FIG. 4, on one or both of the awnings 7 of the vehicle roof 6.

Luggage nets 8 can be designed as elastic, partially elastic or inelastic components, which have sufficient tension force to hold personal or work-related items such as clothing, tools or documents and to secure them against falling out even in the event of strong vibrations. The meshes of luggage nets may be of any size, but a very fine-mesh fabric is preferably used, with the meshes having a dimension of 0.5 mm to 50 mm. When not in use, the luggage nets 8 lie flat against the inside of the vehicle roof, which means that there is virtually no loss of space. When in use, it is ensured that the operators of the road construction machine 1 are not restricted in their usual movement environment or that the view from the driver's cab 5 is reduced.

Different methods may be used for attaching the luggage nets 8 to the vehicle roof 6 and/or to one of the awnings 7 of the vehicle roof 6. For example, the luggage nets 8 may be attached to the vehicle roof 6 and/or to one of the awnings 7 of the vehicle roof 6 by means of two connecting consoles 9. Typically, connecting consoles 9 are made of plastic and extend approximately along the lateral length of the luggage nets 8.

Alternatively, the luggage nets 8 can be attached to the vehicle roof 6 and/or to one of the awnings 7 of the vehicle roof 6 by means of a guide rail 10, whereby the luggage nets 8 can be moved along the guide rail 10 in different positions.

Figure 5:
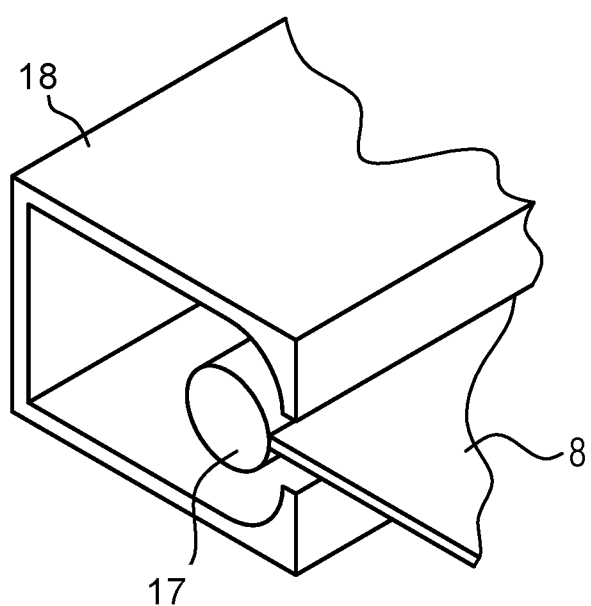
FIG. 5 shows a schematic perspective view of a welt rail.

As shown in FIG. 5, luggage nets may have welts 17 arranged on the luggage net, with the welts 17 inserted into a welt rail 18 incorporated in the vehicle roof 6 or in one of the awnings 7 of the vehicle roof 6.

It is also possible to attach the luggage nets 8 to the vehicle roof 6 and/or to one of the awnings 7 of the vehicle roof 6 using hooks, zips and/or Velcro.

What is claimed is:

1. A road construction machine formed as a road finisher or a feeder vehicle for a road finisher, the road construction machine comprising a chassis on which a driver's cab with a vehicle roof is provided, wherein one or more luggage nets are mounted on the vehicle roof, wherein the vehicle roof comprises one or more awnings, and wherein at least one of the one or more luggage nets is attached to one of the one or more awnings of the vehicle roof.

2. The road construction machine according to claim 1, wherein at least one of the one or more luggage nets comprises an elastic component.

3. The road construction machine according to claim 1, wherein at least one of the one or more luggage nets comprises an inelastic component.

4. The road construction machine according to claim 1, wherein at least one of the one or more luggage nets comprises a partially elastic component which can be stretched in one direction only.

5. The road construction machine according to claim 1, wherein meshes of at least one of the or more luggage nets have a dimension of 0.5 mm to 50 mm.

6. The road construction machine according to claim 1, wherein at least one of the one or more luggage nets is fixedly attached to the vehicle roof.

7. The road construction machine according to claim 1, wherein the at least one of the one or more luggage nets is fixedly attached to the one of the one or more awnings of the vehicle roof.

8. The road construction machine according to claim 1, wherein at least one of the one or more luggage nets is attached detachably without the use of tools to the vehicle roof.

9. The road construction machine according to claim 1, wherein the least one of the one or more luggage nets is attached detachably without the use of tools to the one of the one or more awnings of the vehicle roof.

10. The road construction machine according to claim 1, wherein at least one of the one or more luggage nets is attached to the vehicle roof by means of two lateral connecting consoles.

11. The road construction machine according to claim 10, wherein the connecting consoles comprises plastic.

12. The road construction machine according to claim 1, wherein the at least one of the one or more luggage nets is attached to the one of the one or more awnings of the vehicle roof by means of two lateral connecting consoles.

13. The road construction machine according to claim 12, wherein the connecting consoles comprises plastic.

14. The road construction machine according to claim 1, wherein at least one of the one or more luggage nets is attached to the vehicle roof by means of a guide rail.

15. The road construction machine according to claim 14, wherein the at least one luggage net is displaceably attached to the vehicle roof by means of the guide rail.

16. The road construction machine according to claim 1, wherein the at least one of the one or more luggage nets is attached to the one of the one or more awnings of the vehicle roof by means of a guide rail.

17. The road construction machine according to claim 1, wherein one of the one or more luggage nets has a welt, the welt being attached to the vehicle roof.

18. The road construction machine according to claim 1, wherein a welt rail is incorporated in the one of the one or more awnings, and wherein the one of the one or more luggage nets has a welt that is attached to the welt rail.

19. A road construction machine formed as a road finisher or a feeder vehicle for a road finisher, the road construction machine comprising a chassis on which a driver's cab with a vehicle roof is provided, wherein one or more luggage nets are mounted on the vehicle roof, and at least one of the one or more luggage nets comprises a partially elastic component which can be stretched in one direction only.

20. A road construction machine formed as a road finisher or a feeder vehicle for a road finisher, the road construction machine comprising a chassis on which a driver's cab with a vehicle roof is provided, wherein one or more luggage nets are mounted on the vehicle roof, and at least one of the one or more luggage nets is attached to the vehicle roof by means of a guide rail.

* * * * *